(12) United States Patent
Richardson et al.

(10) Patent No.: US 11,893,145 B2
(45) Date of Patent: Feb. 6, 2024

(54) VIRTUAL MACHINES—COMPUTER IMPLEMENTED SECURITY METHODS AND SYSTEMS

(71) Applicant: BANKVAULT PTY LTD, Perth (AU)

(72) Inventors: Neil Richardson, West Perth (AU); Graeme Speak, Perth (AU)

(73) Assignee: BANKVAULT PTY LTD, West Perth (AU)

( * ) Notice: Subject to any disclaimer, the term of this patent is extended or adjusted under 35 U.S.C. 154(b) by 301 days.

(21) Appl. No.: 16/606,077

(22) PCT Filed: Apr. 18, 2018

(86) PCT No.: PCT/AU2018/050349
§ 371 (c)(1),
(2) Date: Oct. 17, 2019

(87) PCT Pub. No.: WO2018/191780
PCT Pub. Date: Oct. 25, 2018

(65) Prior Publication Data
US 2020/0042749 A1    Feb. 6, 2020

(30) Foreign Application Priority Data
Apr. 18, 2017   (AU) ............................... 2017901397

(51) Int. Cl.
*G06F 21/83* (2013.01)
*G06F 9/455* (2018.01)
(Continued)

(52) U.S. Cl.
CPC .............. *G06F 21/00* (2013.01); *G06F 9/451* (2018.02); *G06F 9/45558* (2013.01); *G06F 21/44* (2013.01); *G06F 2009/45587* (2013.01)

(58) Field of Classification Search
CPC ...... G06F 21/83; G06F 9/451; G06F 9/45558; G06F 21/44; G06F 2009/45587
See application file for complete search history.

(56) References Cited

U.S. PATENT DOCUMENTS 8,656,482 B1 *   2/2014   Tosa ................... G06F 9/45558
                                                                   726/15
9,058,500 B2 *   6/2015   Wu ..................... H04L 63/0428
(Continued)

FOREIGN PATENT DOCUMENTS

| JP | 2003-186614 A | 7/2003 |
| JP | 2015-032056 A | 2/2015 |
| JP | 2016-162278 A | 9/2016 |

OTHER PUBLICATIONS

David Moreland et al.: "A snapshot of trusted personal devices applicable to transaction processing", Personal and Ubiquitous Computing, May 1, 2010, pp. 347-361.
(Continued)

*Primary Examiner* — Saleh Najjar
*Assistant Examiner* — Devin E Almeida
(74) *Attorney, Agent, or Firm* — patenttm.us

(57) ABSTRACT

In one preferred form of the present invention, show in in FIGS. 1 to 3, there is provided a computer implemented security method (10) comprising: providing users (14) with first virtual machines (12), the first virtual machines (12) for being displayed on first electronic devices (18); and providing the users with virtual keyboards (22), the virtual keyboards (22) for providing user input to control the first virtual machines (12), the virtual keyboards (22) for being displayed on second electronic devices (24) that are different to the first electronic devices (18) to reduce the effectiveness of possible malware loggers on the first electronic devices (18).

6 Claims, 13 Drawing Sheets

(51) Int. Cl.
*G06F 21/00* (2013.01)
*G06F 9/451* (2018.01)
*G06F 21/44* (2013.01)

(56) References Cited

U.S. PATENT DOCUMENTS

| | | | |
|---|---|---|---|
| 10,318,320 B1* | 6/2019 | Thomas | G06F 9/45558 |
| 10,409,625 B1* | 9/2019 | Suryanarayanan | G06F 8/656 |
| 2004/0128670 A1* | 7/2004 | Robinson | G06F 9/45558 |
| | | | 718/1 |
| 2006/0089992 A1* | 4/2006 | Blaho | G06F 9/548 |
| | | | 709/227 |
| 2007/0174429 A1* | 7/2007 | Mazzaferri | H04L 63/102 |
| | | | 709/218 |
| 2008/0005320 A1* | 1/2008 | Chen | G06F 21/606 |
| | | | 709/224 |
| 2010/0058064 A1 | 3/2010 | Kirovski et al. | |
| 2011/0185355 A1* | 7/2011 | Chawla | G06F 9/45558 |
| | | | 718/1 |
| 2011/0231670 A1 | 9/2011 | Shevcheinko et al. | |
| 2012/0089666 A1* | 4/2012 | Goswami | G06Q 10/103 |
| | | | 709/203 |
| 2013/0031261 A1* | 1/2013 | Suggs | H04L 63/083 |
| | | | 709/228 |
| 2013/0346903 A1* | 12/2013 | Puppin | G06F 21/36 |
| | | | 715/773 |
| 2014/0012892 A1 | 1/2014 | Adventura | |
| 2014/0215204 A1* | 7/2014 | Wang | G06F 21/83 |
| | | | 713/153 |
| 2016/0092877 A1 | 3/2016 | Chew | |
| 2017/0200005 A1* | 7/2017 | Mooring | G06F 9/45558 |
| 2018/0159896 A1* | 6/2018 | Soman | H04L 63/1491 |

OTHER PUBLICATIONS

Richardson et al. "Virtual Network Computing" IEEE Internet Computing, Institute of electrical and electronics engineers, US, Jan. 1, 1998.

* cited by examiner

VIRTUAL MACHINES—COMPUTER IMPLEMENTED SECURITY METHODS AND SYSTEMS

INCORPORATION BY REFERENCE

All parts and elements of International Applications PCT/AU2014/050050 and PCT/AU2015/050758 are hereby fully incorporated by reference for all purposes.

Priority is claimed from Australian Application 2017901397 filed 18 Apr. 2017 and entitled 'VIRTUAL MACHINES—COMPUTER IMPLEMENTED SECURITY METHODS AND SYSTEMS'. All parts and elements of Australian Application 2017901397 are hereby fully incorporated by reference for all purposes.

FIELD OF THE INVENTION

The present invention relates to virtual machines and computer implemented security methods and systems thereof.

BACKGROUND TO THE INVENTION

There are a number of problems associated with virtual machines. One problem relates to the existence of Malware that might compromise the use of a virtual machine in a virtual machine system.

The problem of Malware is particularly concerning in situations involving banking operations and other applications involving sensitive information.

It is against this background and the problems and difficulties associated therewith that the inventors have developed the present invention.

SUMMARY OF THE INVENTION

According to an aspect of preferred embodiments herein described there is provided a computer implemented security method comprising: providing users with first virtual machines, the first virtual machines for being displayed on first electronic devices; and providing the users with virtual keyboards, the virtual keyboards for providing user input to control the first virtual machines, the virtual keyboards for being displayed on second electronic devices that are different to the first electronic devices to reduce the effectiveness of possible malware loggers on the first electronic devices.

Preferably providing the users with virtual keyboards includes providing the second electronic devices with the virtual keyboards as dedicated virtual keyboards absent display information in relation to the first virtual machines for reducing the effectiveness of possible malware loggers on the second electronic devices.

Preferably providing the users with virtual keyboards includes providing the virtual keyboards as second virtual machines that are distinct from the first virtual machines, each virtual keyboard and second virtual machine corresponding with a respective first virtual machine, and applying the input of each virtual keyboard to the respective first virtual machine.

Preferably providing the users with virtual keyboards includes providing the virtual keyboards as applications that authenticate with each first virtual machine; each virtual keyboard corresponding with a respective first virtual machine; and the method includes applying the input of each virtual keyboard to the respective first virtual machine.

Preferably the method includes using the second electronic devices to scan visual codes provided by the first virtual machines; and using the scanned visual codes to associate the second electronic devices with the first virtual machines Preferably associating the second electronic devices with the first virtual machines comprises authenticating the second electronic devices with the first virtual machines.

Preferably associating the second electronic devices with the first virtual machines comprises authenticating the second electronic devices with the first virtual machines on a one to one basis.

Preferably each visual code is associated with a first virtual machine on a unique basis, the visual code containing the IP address associated with the first virtual machine.

Preferably each visual code includes an occasional password.

Preferably providing the users with virtual keyboards includes providing the virtual keyboards as applications that authenticate with each first virtual machine, each virtual keyboard corresponding with a first virtual machine and associated with the same session as the session associated with the first virtual machine; each virtual keyboard corresponding with a respective first virtual machine, and applying the input of each virtual keyboard to the respective first virtual machine. In other embodiments a second session may be used.

Preferably the method includes decrypting encrypted keypresses received from the second electronic devices and applying the keypresses in the first virtual machines.

According to an aspect of preferred embodiments herein described there is provided a computer implemented security system comprising: a virtual machine manager for providing users with first virtual machines, the first virtual machines for being displayed on first electronic devices; a virtual keyboard manager for providing the users with virtual keyboards for providing user input to control the first virtual machines, the virtual keyboards for being displayed on second electronic devices that are different to the first electronic devices to reduce the effectiveness of possible malware loggers on the first electronic devices.

Preferably the virtual keyboard manager is configured to provide the second electronic devices with virtual keyboards as dedicated virtual keyboards absent display information in relation to the first virtual machines for reducing the effectiveness of possible malware loggers on the second electronic devices.

Preferably the virtual machine manager is configured to provide the virtual keyboards as second virtual machines that are distinct form the first virtual machines, each virtual keyboard and second virtual machine corresponding with a respective first virtual machine, and applying the input of each virtual keyboard to the respective first virtual machine.

Preferably the virtual machine manager is configured to provide the virtual keyboards as applications that authenticate with each first virtual machine; each virtual keyboard corresponding with a respective first virtual machine; the respective first virtual machine applying the input of each virtual keyboard to the respective first virtual machine.

Preferably the system includes an authenticator configured to provide visual codes for being scanned by the second virtual machines to provide association information; the authenticator being further configured to receive the verification information to associate the second electronic devices with the first virtual machines Preferably the authenticator is configured to provide the visual codes with association information where the visual codes identify the first virtual machines on a unique basis.

Preferably the authenticator is configured to associate each visual code with a first virtual machine on a unique basis, the visual code containing the IP address associated with the first virtual machine.

Preferably each visual code also includes an occasional password.

Preferably the virtual machine manager is configured to provide the virtual keyboards as applications that authenticate with each first virtual machine, each virtual keyboard corresponding with a first virtual machine and associated with the same session as the session associated with the first virtual machine; each virtual keyboard corresponding with a respective first virtual machine, the respective first virtual machine applying the input of the associated virtual keyboard to the first virtual machine. In other embodiments a second session may be used.

Preferably the first virtual machines are configured to decrypt encrypted keypresses received from the second electronic devices According to an aspect of preferred embodiments herein described there is provided a virtual keyboard comprising: an application for providing a graphical user interface for receiving keypress information; a communications facility for sending the keypress information to a server system for updating a virtual machine; the application being configured not to recognise or show display information in relation to the virtual machine on the device running the application, the virtual machine for being displayed on a different device to reduce the effectiveness of possible malware loggers on the device running the application.

Preferably the virtual keyboard is configured to provide a full screen interface providing a number of key elements for being pressed by the user; and the communication facility is configured to send encrypted representations of the key elements, when pressed, to the server facility.

According to an aspect of preferred embodiments herein described there is provided a computer implemented security method comprising: sending display information associated with virtual machines to users, the display information being sent from a server system to first electronic devices, the display information being provided due to respective first communication groupings, each first communication grouping comprising data sent between the server system and a respective first electronic device; in connection with each first communication grouping, receiving user input provided due to a respective second communication grouping, the second communication groupings comprising data sent between the server system and second electronic devices, each second communication grouping being separate from the first communication grouping, the separation serving to disassociate display information from the user input for reducing the effectiveness of possible malware loggers on the first electronic devices.

Preferably the method includes providing a virtual keyboard for each second communication device, the virtual keyboard being configured to send information from the second electronic device.

Preferably sending display information in connection with virtual machines to the first electronic devices comprises sending the display information to first IP addresses associated with the first devices; and receiving the user input comprises receiving user input from a second IP addresses associated with the second devices, the second IP addresses being different to the first IP addresses.

Preferably the method includes causing display information sent to a first electronic device to provide an update as result of the user input from the second electronic device associated with the first electronic device.

Preferably sending display information from a server system to each first electronic device comprises providing a main desktop session in association with a virtual machine and sending display information in connection with the main desktop display.

Preferably the method includes providing a secondary session that runs alongside the main desktop session, the secondary session providing a virtual keyboard as a full screen application.

Preferably the method includes sending user input from each second electronic device to a respective secondary session and then sending the user input from each secondary session to the respective main desktop session.

Preferably the method includes sending user input from each second electronic device to an application running on the main desktop session; and applying the user input to the main desktop session using the application.

According to an aspect of preferred embodiments herein described there is provided a computer implemented security method comprising: receiving display information associated with a virtual machine from a server system and displaying the display information on a first electronic device, the display information being provided due to a first communication grouping comprising data sent between the server system and the first electronic device; in connection with the first communication grouping, sending user input provided due to a respective second communication grouping, the second communication grouping comprising data sent between the server system and a second electronic device, the second communication grouping being separate from the first communication grouping, the separation serving to disassociate display information from the user input for reducing the effectiveness of possible malware loggers on the first electronic device.

Preferably the method includes providing the second electronic device with a virtual keyboard configured to send information from the second electronic device.

Preferably receiving display information in connection with a virtual machine from a server system comprises receiving the display information directed to a first IP address associated with the first device; and sending the user input from the second electronic device comprises sending user input from a second IP address, different to the first IP address.

Preferably the method includes causing display information received to be updated as result of the user input.

According to an aspect of preferred embodiments herein described there is provided a computer implemented security method comprising: providing display information associated with a virtual machine, the display information being provided due to a first communication grouping; causing the display information to be updated in response to user input, wherein the user input is due to a second communication grouping that is separate from the first communication grouping, the separation serving to disassociate display information from the user input for reducing the effectiveness of malware.

According to an aspect of preferred embodiments herein described there is provided a computer implemented security method comprising: providing users with first virtual machines, each first virtual machine for being displayed on a first electronic device; and providing users with virtual keyboards; each virtual keyboard for providing user input to control a respective first virtual machine displayed on a first electronic device, the virtual keyboard for being displayed on a second electronic device that is different to the first electronic device to reduce the effectiveness of possible malware loggers.

Advantages and preferred features will be apparent from the drawings and a reading of the specification as a whole.

BRIEF DESCRIPTION OF DRAWINGS

In order to facilitate a better understanding of the present invention, several preferred embodiments will now be described with reference to the accompanying drawings, comprising.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
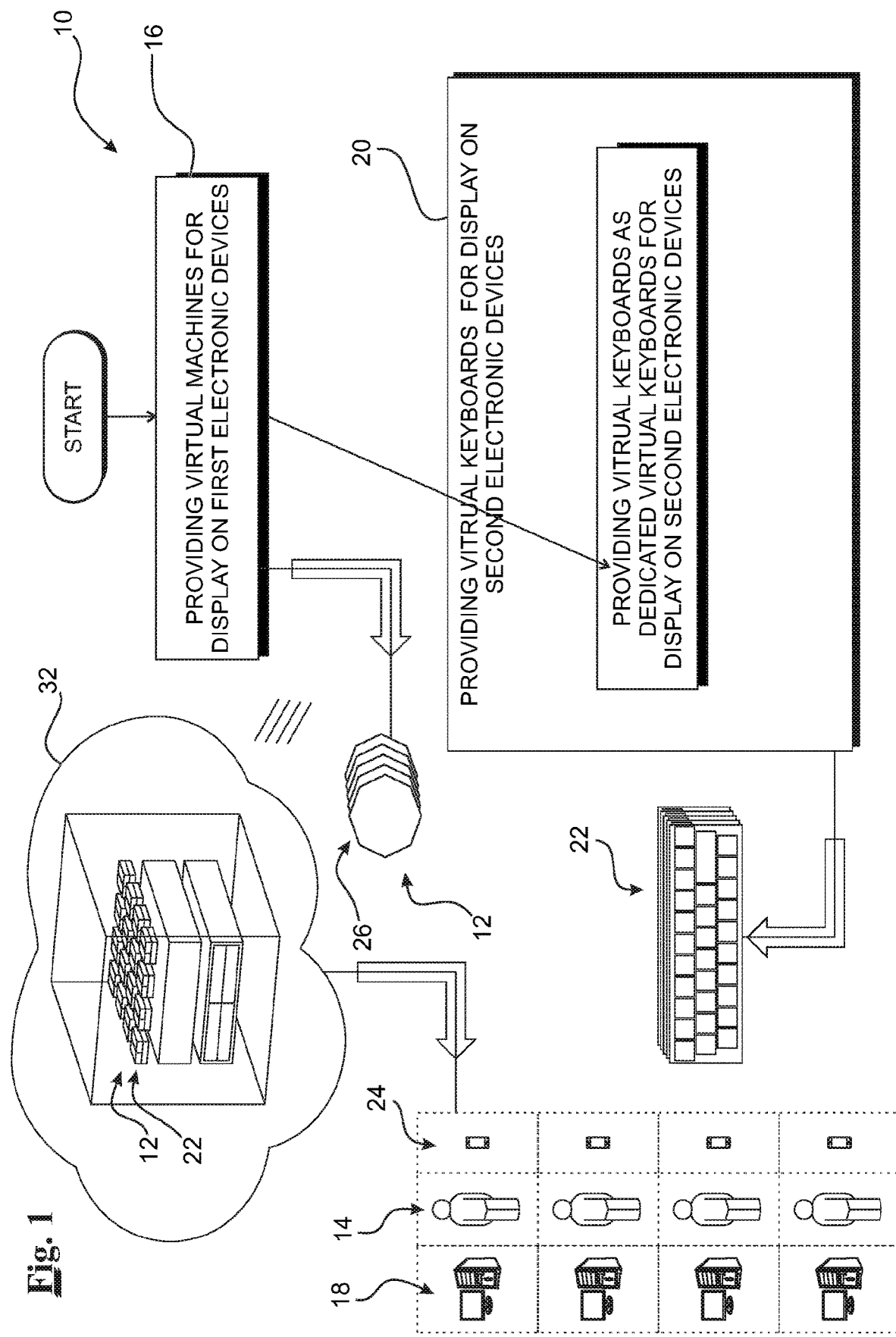
FIG. 1 provides an illustration of a computer implemented method according to a first preferred embodiment of the present invention.

Referring to FIG. 1 there is shown a computer implemented security method 10 according to a first preferred embodiment of the present invention. The method 10 is considered to advantageously to reduce the effectiveness of a number of possible malware loggers in relation to a number of first virtual machines 12 that are provided to users 14.

Each virtual machine 12 includes an operating system, several applications and data storage as described in PCT/AU2014/050050 filed in the name of GoPC Pty Ltd. In the present embodiment, Kernel-based Virtual Machine (KVM) virtual machine technology is used. Various types of virtual machine technology are able to be utilized.

At block 16, the method 10 includes providing the users 14 with the first virtual machines 12. As part of block 16 the method 10 includes the first virtual machines being provided for display on first electronic devices 18. At block 20, the method 10 includes providing the users 14 with virtual keyboards 22 providing for user input to control the first virtual machines 12—causing the first virtual machines 12 to update as a result of the user input.

As part of block 20, the method 10 includes the virtual keyboards 22 being provided for display on second electronic devices 24 that are different to the first electronic devices 18 to reduce the effectiveness of possible malware loggers on the first electronic devices 18. In this embodiment the first electronic devices 18 have larger displays than the second electronic devices 24. This is to allow each first electronic device 18 to be used as a general computer, albeit controlling a virtual machine.

More particularly the first electronic devices 18 comprise personal computers and the second electronic devices 24 comprise mobile devices. The operating systems of the first electronic devices 18 and second electronic devices 24 in the embodiment comprise several known systems including Windows, Linux, Mac OS, and Android. In order for the method 10 to operate the operating systems of the first electronic devices 18 and second electronic devices 24 must simply be able to display a virtual machine using a configured software application.

The first virtual machines 12 are provided with display information 26 which in this embodiment comprises typical online banking information from a banking portal providing access to an online bank account. The banking information includes as user identification numbers and account balances. Advantageously, in the method 10 providing the users 14 with virtual keyboards 22 at block 16 includes providing the second electronic devices 24 with the virtual keyboards 22 as dedicated virtual keyboards 22 absent the display information 26 provided in relation to the first virtual machines 12.

This is considered to advantageously reduce the effectiveness of possible malware loggers on the second electronic devices 24. By separating user input to input provided using the virtual keyboards 22 that are displayed on the second electronic devices 24, communication channels separated from the first electronic devices 18 are advantageously used. This means that a key or screen shot malware logger that would record a password entered via the first electronic device 18 cannot record the password. This occurs because the user input occurs using the second electronic devices 24 rather than the first electronic devices 18, which could be infected with malware. In the case of screenshot loggers, this of course assumes that the password is masked in the display information 28, which could otherwise be recorded by a screenshot/video malware logger on the associated first electronic device 18.

Figure 2:
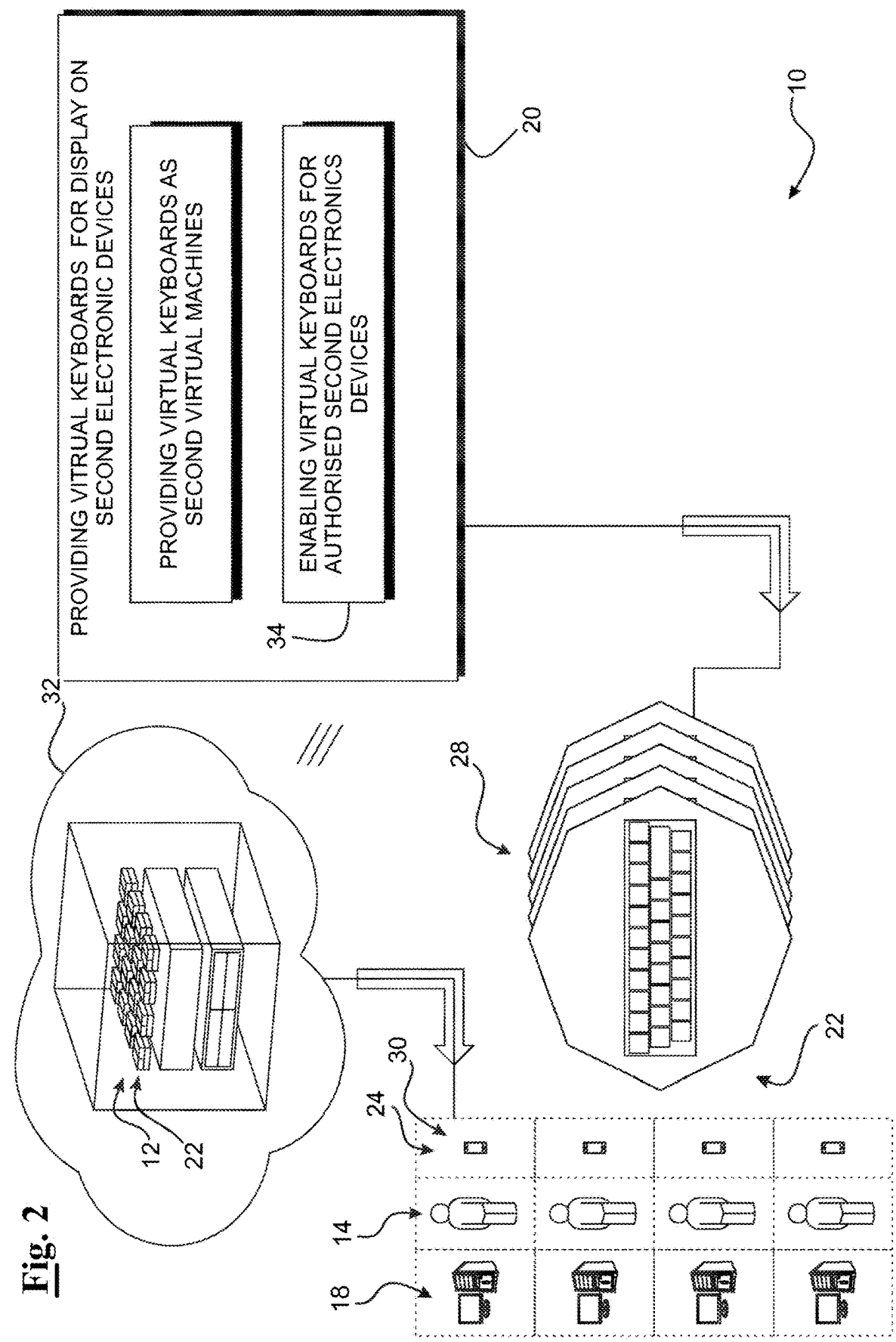
FIG. 2 provides an illustration of the computer implemented method shown in FIG. 1.

Referring to FIG. 2, the method 10 at block 20 includes providing the virtual keyboards 22 as second virtual machines 28 that are distinct from the first virtual machines 12. Each second virtual machine 28 has its own operating system and keyboard application stored on the second virtual machine 28. The virtual machines 12 are provided to a deployment application 30 that is preloaded on each second electronic device 24. In this embodiment the deployment applications 30 each comprise an application that is downloaded from an application marketplace provided by the corresponding operating system provider of the second electronic device 24. In this particular embodiment the display of the first virtual machines 12 and the second virtual machines 22 is streamed from a virtual machine provider 32.

Notably in another embodiment each virtual keyboard is provided by another session on the associated first virtual machine. In these alternative embodiments this session runs parallel to a main desktop session which provides access to the banking portal. Each associated main desktop session and the other session run on the same first virtual machine. The desktop sessions are spawned separately and communicate via inter-process methods.

Returning to FIG. 2, at block 34, the method 10 of the present embodiment includes enabling virtual keyboards 22 for authorised second electronic devices 24. This occurs by the user 14 having to enter an email address or mobile number or another second factor address in association with their account. A unique code is sent to the second factor address which has to be entered into the deployment application 30 for the deployment application 30 to authorise the second virtual machine 28 in connection with the particular electronic device 24 (or vice versa).

When a user 14 initiates a request for a first virtual machine 12 for a first electronic device 18, a first virtual machine is allocated to the user in accordance with PCT/AU2014/050050. A second virtual machine 28 is also allocated to the user to provide a virtual keyboard 22. If a deployment application 30 has be authorised on the user's mobile phone 24 a request is sent to the phone 24 to load the virtual keyboard 22 in the deployment application 30.

The deployment application 30 requests the user 14 enter his or her password. The deployment application does not require the user's account name. In this embodiment, the password is entered, the deployment application then displays the second virtual machine 28 providing the virtual keyboard 22. If required to gain access a banking interface displayed by the first electronic device 18, the user can enter his or her banking identification number and password using the virtual keyboard as opposed to through a first electronic device 18.

Figure 3:
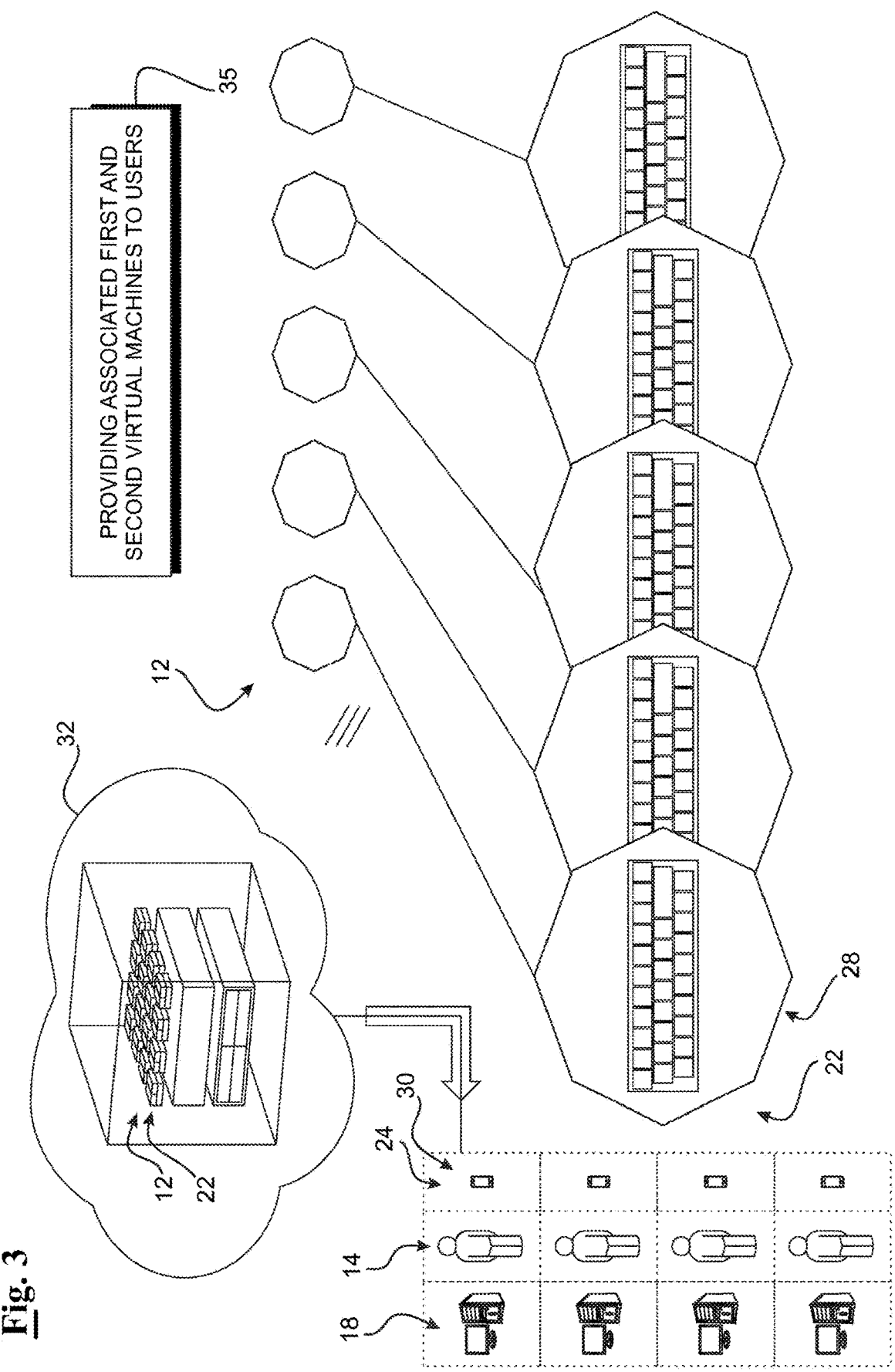
FIG. 3 provides an illustration of the computer implemented method shown in FIGS. 1 and 2.

As illustrated in FIG. 3, each first virtual machine 12 is associated with a virtual keyboard 22 on a one to one basis. Whilst this is preferred it may be the case that, in another embodiment, a user has several mobile phones and each mobile phone may be provided with a virtual keyboard for the first virtual machine 12 allocated to the user 14.

Whilst a one-to one association is preferred in various embodiments, each second virtual machine 28 is associated with the first virtual machine 12 for the purpose of providing key press information. FIG. 3 illustrates a one-to one association. At block 35, the method 10 includes providing associated first and second virtual machines to users 14. As described each user 14 is provided with a first machine 14 and a second machine 28.

It is possible for a user to use a virtual keyboard 22, once a first virtual machine 12 and a second virtual machine 28 have been allocated and associated, and respectively displayed on the users first electronic device 18 and mobile phone 24. Using a virtual keyboard 22, virtual keyboard data, when entered using the virtual keyboard 22, is received and then sent by the virtual machine provider 32 to the associated first virtual machine 12.

Figure 4:
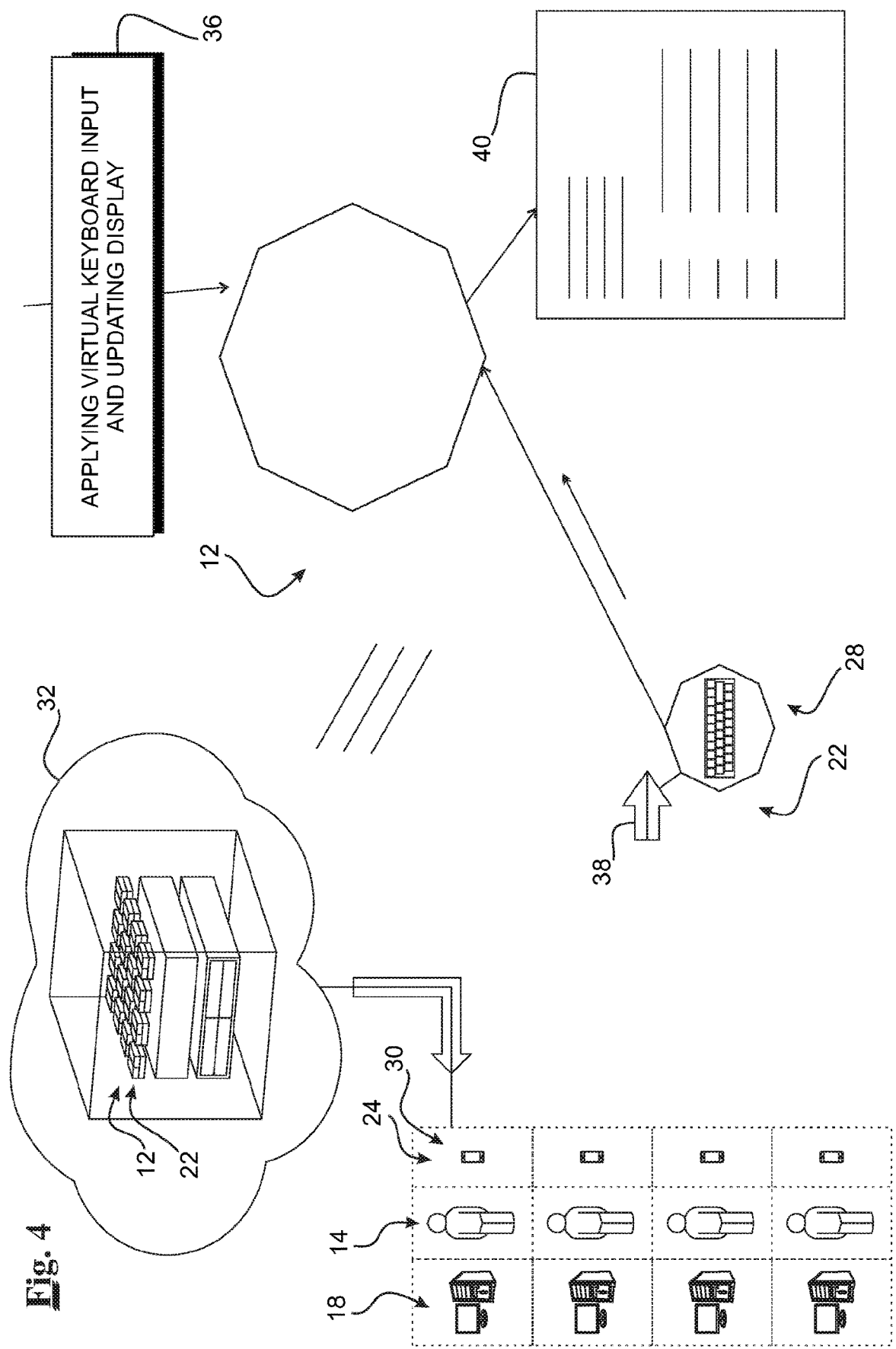
FIG. 4 provides an illustration of the computer implemented method shown in FIGS. 1 to 3.

Referring to FIG. 4, at a block 36 the method 10 includes applying the input 38 of each virtual keyboard 22 to the respective first virtual machine 12 and updating the display 40 provided to the associated first virtual machine 12 shown on the corresponding first electronic device 18. With the first virtual machine 12 provided on the users first electronic device 18 (say a desktop), the user can use the associated virtual keyboard 22 provided on the users mobile phone 24 to send keyboard information that is isolated from the memory of the first electronic device 18. This is because keypresses are processed from the second electronic device 24 to the first virtual machine 12 before any updated display is streamed to the first electronic device 18. In the embodiment described, the keyboard layout of the virtual keyboards is not randomized to change the location of keypresses. In other embodiments randomization could be provided as an added security measure. Given that the keyboard operates remote form the first electronic device 18 it is considered that randomization provides a greater degree of complexity that does not justify any added security. Randomization is accordingly not preferred.

Figure 5:
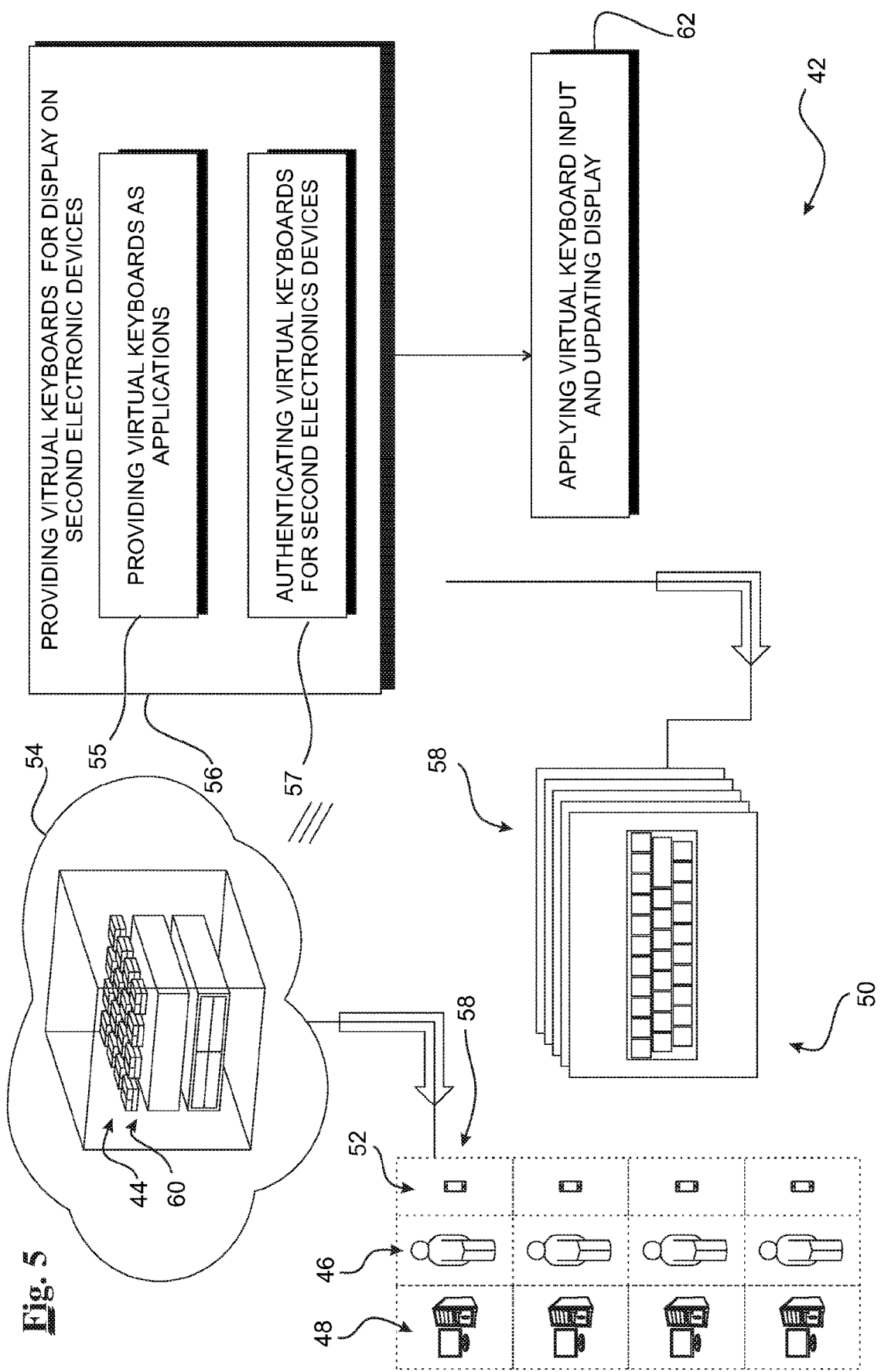
FIG. 5 provides an illustration of a computer implemented method according to a second preferred embodiment of the present invention.

FIG. 5 illustrates a further preferred embodiment in the form of a computer implemented security method 42. In the method 42 the virtual keyboards are not streamed to the second electronic devices. In the method 42, there are provided first virtual machines 44, users 46, first electronic devices 48, virtual keyboards 50, second electronic devices 52, a virtual machine provider 54. At block 56, the method 100 includes providing the virtual keyboards 50 for display on second electronic devices 52.

The method 42 provides the virtual keyboards as applications 58 that can be downloaded from an application store. The applications 58 are installed on the second electronic devices 68 by the users 46. The applications 58 provide the virtual keyboards 50, rather than the virtual keyboards being streamed as further virtual machines as was the case in the embodiment of FIG. 1.

More particularly, at block 56 providing the users 46 with the virtual keyboards 50 includes (at block 55) providing the virtual keyboards 50 as applications 58 that authenticate with the first virtual machines 44. In the method 42, this occurs at block 57.

In this embodiment the authentication comprises mutual authentication. This occurs because both the second electronic devices 52 and the virtual system provider 54 know the user's authentication password. The applications 58 authenticate with the virtual session 60 of each first virtual machine 44. An approach for mutual authentication is described in relation to a further embodiment below.

At block 56 in the method 42, the applications 58 once authenticated provide a virtual keyboard 50 corresponding with a first virtual machine 44. For this reason, each virtual keyboard 50 is associated with the same session 60 associated with the first virtual machine 44. Similarly, each virtual keyboard 50 can be considered as corresponding with a respective first virtual machine 44. In the method 42, at block 62 the input of each virtual keyboard is applied to the respective first virtual machine 44.

Figure 6:
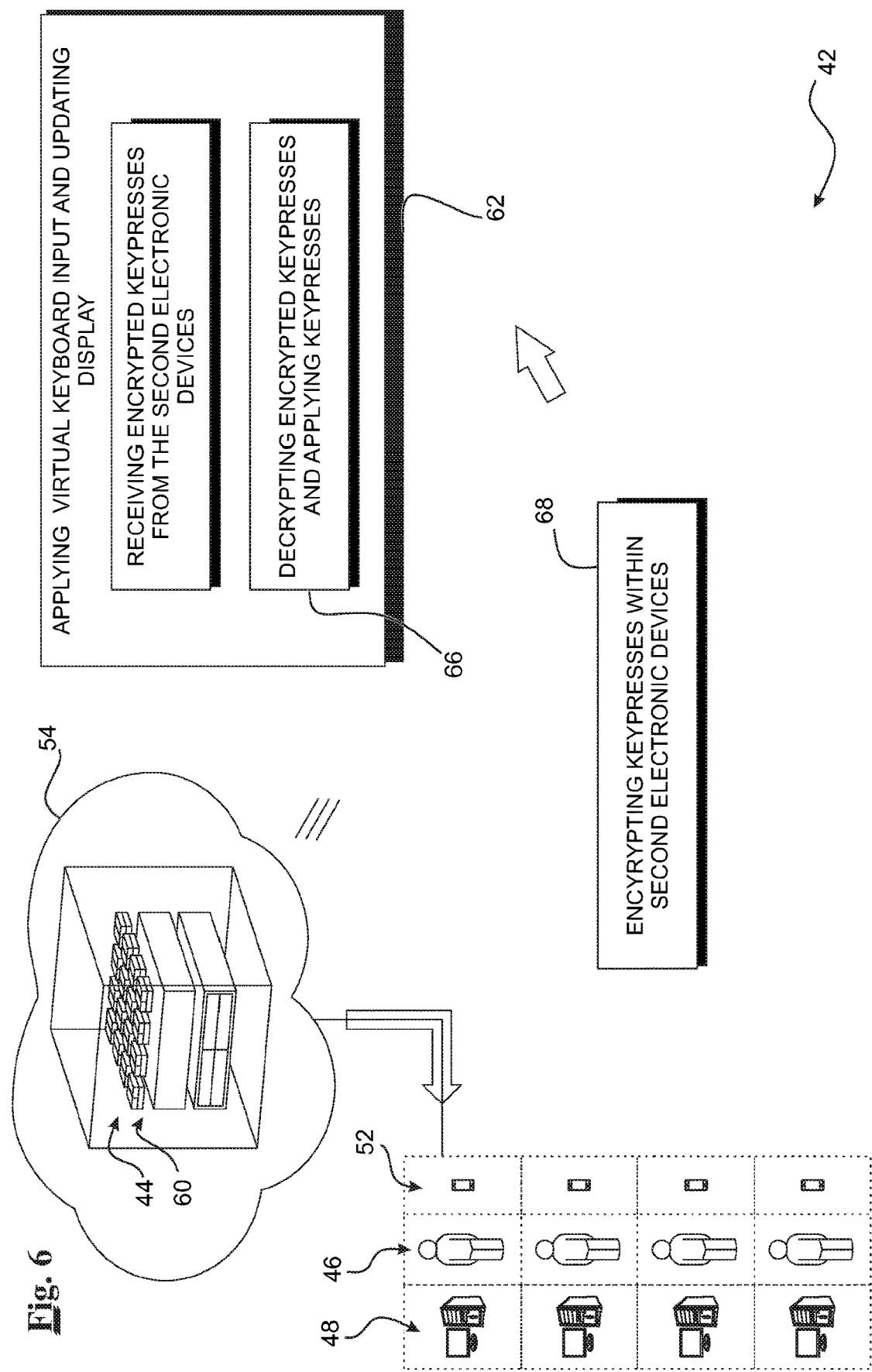
FIG. 6 provides an illustration of the computer implemented method shown in FIG. 5.

Block 62 is detailed further in FIG. 6. At block 62, the method 42 includes receiving encrypted keypresses from the second electronic devices 52. At block 66 the method 42 includes decrypting the encrypted keypresses and applying the keypresses in the first virtual machines. At block 68 the method 42 includes encrypting keypresses based on private user information known to the second electronic devices 52. The embodiment of FIGS. 5 and 6 provides a local application approach.

Figure 7:
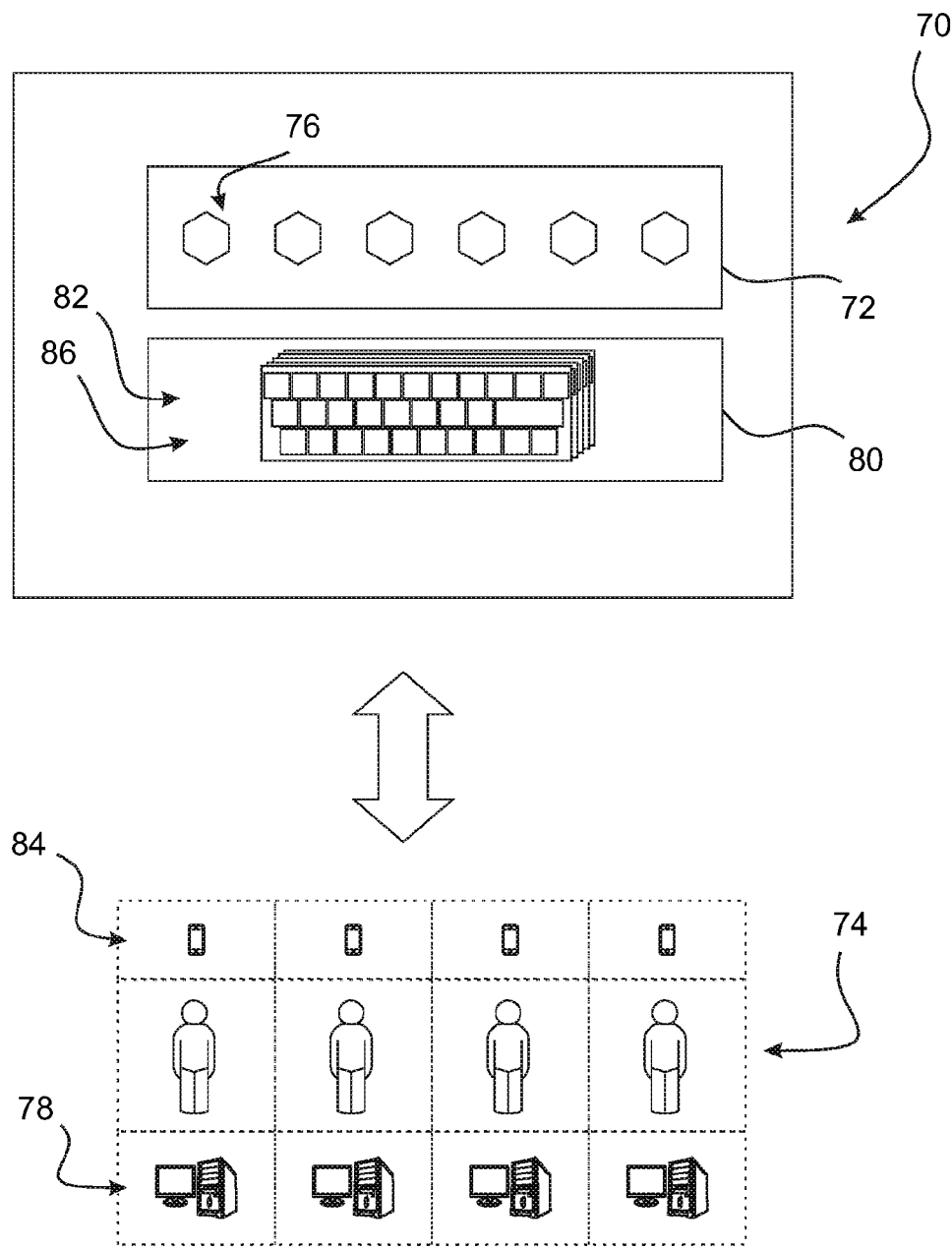
FIG. 7 provides a schematic illustration of a computer implemented system according to another preferred embodiment of the present invention.

FIG. 7 illustrates a computer implemented security system 70 according to a further preferred embodiment of the present invention. The security system 70 includes a virtual machine manager 72 for providing users 74 with first virtual machines 76. The first virtual machines 76 are provided for being displayed on first electronic devices 78.

The system 7Q includes a virtual keyboard manager 80 for providing the users 74 with virtual keyboards 82. The virtual keyboards 82 allow for user input to control the first virtual machines 76. The virtual keyboards 82 are provided for being displayed on second electronic devices 84. The second electronic devices are different to the first electronic devices 78 to provide different communication channels to the virtual machines 76 to reduce the effectiveness of possible malware loggers installed on the first electronic devices 78.

The virtual keyboard manager 80 is configured to provide the second electronic devices 84 with virtual keyboards 82 as dedicated virtual keyboards. Each virtual keyboard 82 is configured to display keyboard information rather than display information corresponding with a desktop provided by the respective first virtual machine 76.

By not displaying desktop information, the virtual keyboards on the second electronic devices 84 provide a separate communications channel distinct from the application environment provided by the systems of the first electronic devices 78. The systems of the first electronic devices 78 could be infected by various keyloggers. In the present arrangement entry of sensitive information along with contextual information from the displays of the first virtual machines 76 does not occur. Most browsers are equipped with password display obfuscation which means that any password entered would not be shown and therefore could not be recovered by infection of one or more of the first electronic devices 78 by a screenshot logger.

The virtual keyboard manager 80 is configured to provide the virtual keyboards 82 as second virtual machines 86 that are distinct from the first virtual machines 76. By virtue of the second virtual machines 86 being different to the first virtual machines 76 different communication paths are utilized. Each virtual keyboard 82 and second virtual machine 86 corresponds with a respective first virtual machine 76 that is provided to a user 74. Each second virtual machine 86 is configured to apply the input of the associated virtual keyboard 82 to the respective corresponding virtual machine 76. In this manner users 74 are able to enter passwords and other information without having to worry whether a first electronic device 78 is infected with a keylogger.

In another embodiment, the virtual keyboard manager 80 is configured to provide the virtual keyboards 82 as applications that authenticate with each first virtual machine 76. Each virtual keyboard corresponds with a first virtual machine 76 and is associated with the same session as the session associated with the first virtual machine 76. Each virtual keyboard 82 corresponds with a respective first virtual machine 76. The respective first virtual machine 76 applies the input of the associated virtual keyboard to first virtual machine once received. Each first virtual machine includes a decryptor configured to decrypt encrypted keypresses received from the second electronic devices (which each include an encryptor). A mutual encryption approach is utilized without the transfer of passwords. Various encryption approaches could of course be used.

Figure 8A:
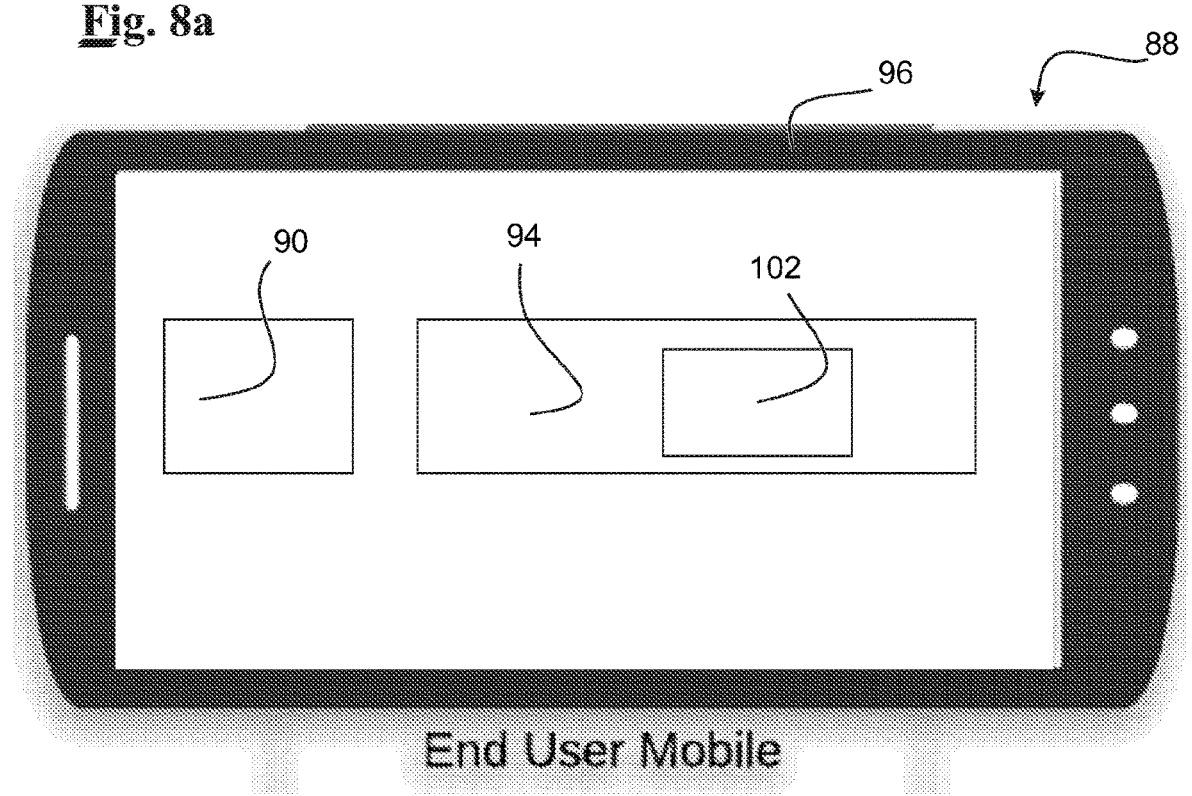
FIGS. 8a and 8b provide illustrations of a virtual keyboard according to another preferred embodiment of the present invention.
Figure 8B:
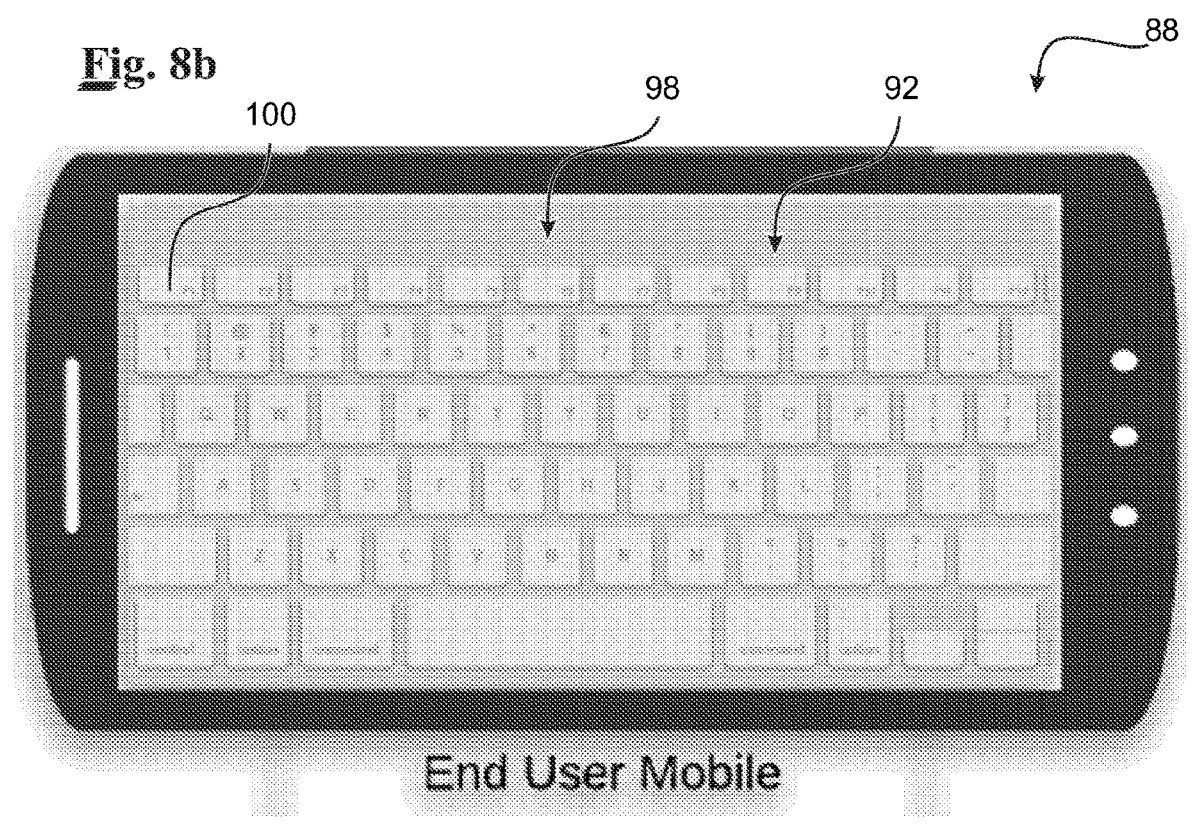

FIGS. 8a and 8b illustrate a virtual keyboard 88 according to a further preferred embodiment of the present invention. The virtual keyboard 88 comprises an application 90 providing a graphical user interface 92 for receiving keypress information. The virtual keyboard 88 includes a communications facility 94 for sending the keypress information to the server system 70 (see FIG. 7) for updating a virtual machine 76 associated with the virtual keyboard 88. The application 90 is configured not to recognise or show display information in relation to the virtual machine 76 on the device 96 running the application 90. The virtual machine 76 is provided for being displayed on a different device to the device 96 to reduce the effectiveness of possible malware loggers on the device 96.

Advantageously the virtual keyboard 88 is configured to provide a full screen interface 98 providing a number of key elements 100 for being pressed by the user. The communication facility 94 includes an encryptor 102 configured to send encrypted representations of the key elements, when pressed, to the system 70.

Figure 9:
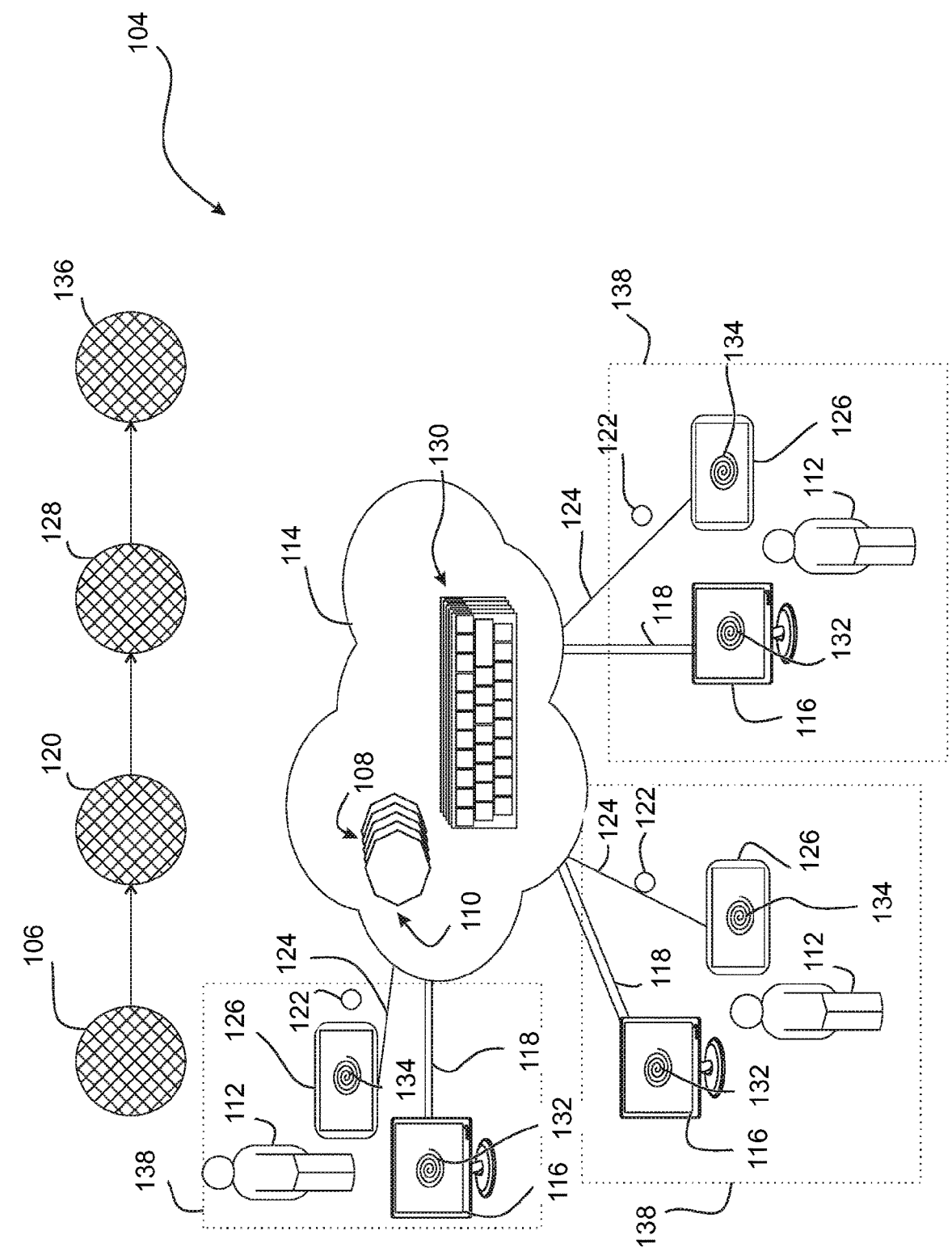
FIG. 9 provides an illustration of a computer implemented method according to another preferred embodiment of the present invention.

Referring to FIG. 9, there is shown a computer implemented security method 104 according to a further preferred embodiment of the present invention. At a first block 106, the method 104 includes sending display information 108 associated with virtual machines 110 to users 112. The display information 108 is sent from a server system 114 to first electronic devices 116. The display information 108 is provided via respective first communication groupings 118. Each first communication grouping 118 comprises data sent between the server system 114 and a respective first electronic device 116.

In connection with each first communication grouping 118, at block 120, the method 104 includes receiving user input 122 as keypress information provided due to a respective second communication grouping 124. Each second communication grouping 124 is associated with a first communication grouping 118 of the particular user 112.

Each user 112 has a local first electronic device 116 and a local second electronic device 126. Each second communication groupings 124 comprises data sent between the server system 114 and the corresponding second electronic device 126. Each second communication grouping 124 is separate from the associated first communication grouping 118 for the particular user 112. As with the previous embodiments the separation advantageously serves to disassociate display information 108 from the user input 122 for reducing the effectiveness of possible malware loggers on the first electronic devices 116.

In the method at block 128, the method 104 includes providing a virtual keyboard 130 for each second communication device 124. Each virtual keyboard 130 is configured to receive and send keypress information from the associated second electronic device 126.

Sending display information in connection with virtual machines to the first electronic devices at block 106 comprises sending the display information to first IP addresses 132 associated with the first devices 116. Receiving the user input 122 comprises receiving user input from second IP addresses 134 associated with the second devices 126, the second IP addresses 134 are different to the first IP addresses 132 as they are associated with different devices. Each IP address of the first devices 116 and the second devices 126 is different.

At block 136 the method 104 includes causing further display information sent to a the associated first electronic device to provide an update as result of the user input from a second electronic device associated with the first electronic device.

This occurs as the display information provided shows a virtual desktop with the virtual keyboard providing an input which generally causes an update to the desktop. Thus at block 136 sending display information from the server system 114 to each first electronic device 116 comprises providing a main desktop session in association with a virtual machine and sending display information in connection with the main desktop display. In this embodiment each virtual keyboard 130 is provided as a secondary session that runs alongside the main desktop session, the secondary session providing a virtual keyboard as a full screen application. The method 104 includes sending user input 122 from each second electronic device 126 to a respective secondary session and then sending the user input 112 from each secondary session to the respective main desktop session.

In terms of each user grouping 138, the method 104 includes receiving display information associated with a virtual machine from a server system and displaying the display information on a first electronic device, the display information being provided due to a first communication grouping comprising data sent between the server system and the first electronic device. In connection with the first communication grouping, the method includes sending user input provided due to a respective second communication grouping, the second communication grouping comprising data sent between the server system and a second electronic device, the second communication grouping being separate from the first communication grouping, the separation serving to disassociate display information from the user input for reducing the effectiveness of possible malware loggers on the first electronic device. The second electronic device is provided with a virtual keyboard configured to send information from the second electronic device. Receiving display information in connection with a virtual machine from a server system comprises receiving the display information directed to a first IP address associated with the first device; and sending the user input from the second electronic device comprises sending user input from a second IP address, different to the first IP address. The method includes causing display information received to be updated as result of the user input.

A further preferred computer implemented security method comprises: providing display information associated with a virtual machine, the display information being provided due to a first communication grouping; causing the display information to be updated in response to user input, wherein the user input is due to a second communication grouping that is separate from the first communication grouping, the separation serving to disassociate display information from the user input for reducing the effectiveness of malware. A further method includes providing users with first virtual machines, each first virtual machine for being displayed on a first electronic device; and providing users with virtual keyboards; each virtual keyboard for providing user input to control a respective first virtual machine displayed on a first electronic device, the virtual keyboard for being displayed on a second electronic device that is different to the first electronic device to reduce the effectiveness of possible malware loggers.

In another preferred embodiment of the present invention there is provided a further computer a security system. As before, the computer security system is considered to have some advantages in protecting end users from malware on their PC in endeavouring to allow users to securely perform sensitive online tasks, including online banking.

In the embodiment, it is considered that users can avoid most key-logging malware by using an on-screen keyboard that, in the embodiment, runs on a separate second machine providing a separate communications grouping.

Consequently, rather than users having to type in their passwords on their local PC, the separate machine provides a further tier of protection. Thus, whilst a local machine might be infected with a type of malware that takes screen shots or video of an end-user's screen (and upload them to a hacker's server), the separate machine provides a separate communications grouping that serves to separate password entry from related visual information that is shown on a user's local machine.

The embodiment particularly relates to online banking applications requiring a personal identification number. The use of a second machine provides for password entry separate from personal identification number entry. The personal identification number entry occurs with the use of the users first machine and a first communication grouping. In order logon, the two communications groupings must be utilized as they provide separate channels. The first communication grouping occurs as encrypted communications between the user's local machine and the virtual computer provider. The first communication grouping provides for entry of the user's personal identification banking number. The second communication grouping occurs as encrypted communications between the user's second machine and the virtual computer provider. Two channels of communications are utilized with different sources.

Thus, whilst malware on the first machine might reveal a user's personal identification number, malware would have to be used on the second machine as well. Furthermore, the data would have to be combined to return both the users personal identification number and the user's password in order to provide sufficient logon details.

Whilst the data from the first communication grouping and the second communication grouping are ultimately combined by the service provider in association with the virtual machine, the combination of the data occurs in a managed environment that is considered to be of much reduced risk in comparison to a user's local machine. The applicant has previously filed a number of applications directed to the provision of virtual machines to users. International Applications having application numbers PCT/AU2014/050050 and PCT/AU2015/050758 are hereby incorporated by reference for all purposes including the provision of virtual machines.

The preferred embodiment is considered to move the input of sensitive information from the user's PC to another device. In this embodiment, the password. As before a virtual keyboard running on a mobile phone is utilised as the second machine. The second communication grouping occurs between the mobile phone and the service provider. The second communication grouping comprises end to end encrypted communications between the mobile phone and the service provider. In this embodiment, the second communication grouping has a different source but the same destination (the service provider) as the first communication grouping. Other embodiments could have different destinations.

Figure 10:
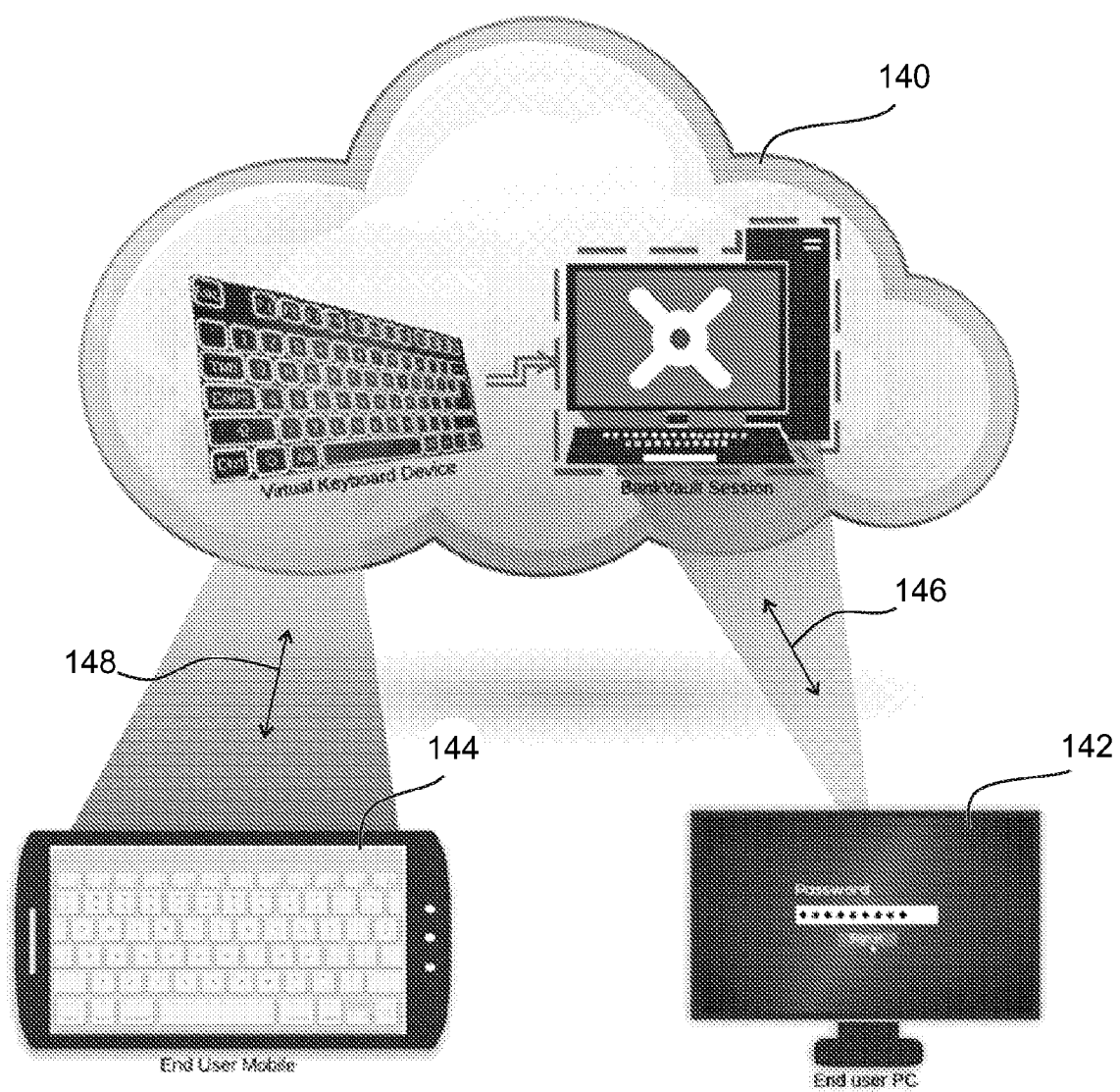
FIG. 10 provides a schematic illustration of a computer implemented system according to yet another preferred embodiment of the present invention.

FIG. 10, illustrates a server system 140, a first machine 142 and a second machine 144. The first machine 142 communicates with the central server 140 as a first communication grouping 146.

The second machine 144 communicates with the central server 140 as a second communication grouping 148. The first machine 142 and the second machine 144 exchange public keys with the server system 140, to provide secure communication channels.

More particularly, in this particular embodiment, the server system 140 provides a remote virtual machine for the end user's desktop session. In addition, the server system 140 provides a separate secondary X11 display environment that runs in parallel with the main desktop display environment. Inside the secondary display environment, a single full screen app (such as onboard [https://launchpad.net/onboard]) is run to act as a virtual keyboard device for the main desktop display session. Thus whilst two display environments are provided, the second display environment acts as a virtual keyboard for the first display environment. The graphical user interface of the virtual keyboard is displayed on the user's mobile phone, the user is able to action the virtual keyboard to cause events in the second display environment that are communicated to the first display environment.

More particularly, on the second machine 144, the mobile phone, a remote desktop display app is run. This application is responsible for rendering the remote application and for translating screen touch events into mouse click events. When a key is 'clicked' on the remote application provided by the graphical user interface of the virtual keyboard, a bridging program sends the key to the server desktop display environment.

Figure 11:
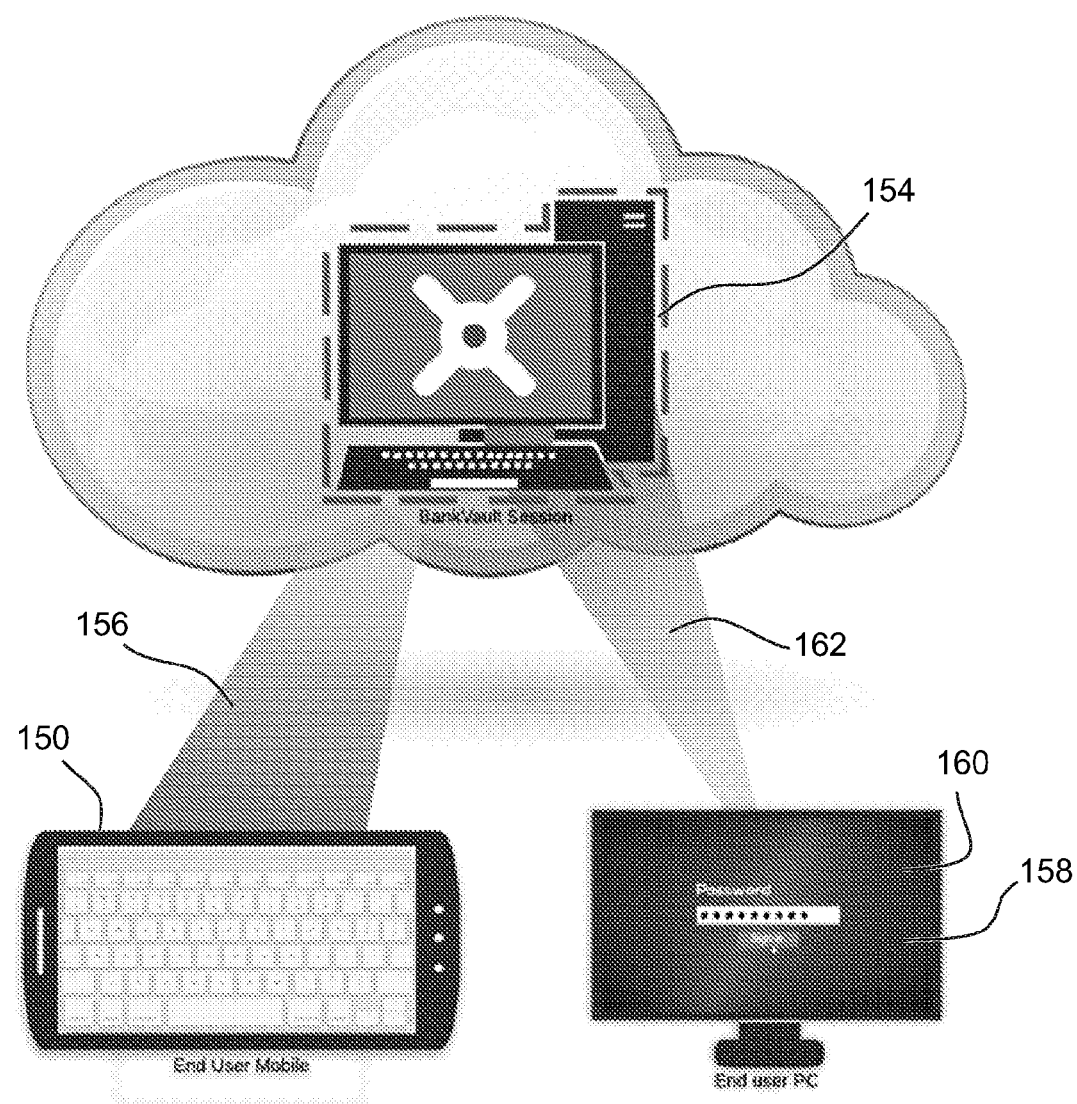
FIG. 11 provides a schematic illustration of a computer implemented system according to yet another preferred embodiment of the present invention.

In another embodiment illustrated in FIG. 11, an application 150 runs on the mobile phone to emulate a keyboard. The application captures key presses and sends them to the remote desktop session 152. The end user runs an application 150 on their mobile phone, which authenticates to their remote desktop session 154. Once the end user is authenticated, a secure communication channel 156 is established between the mobile phone and the remote desktop session 154. When a key is pressed on the virtual keyboard, an encrypted message describing that key-press is sent via the secure communication channel 156 to the remote desktop session 154 and is decrypted and turned into a keypress. This embodiment is considered to provide similar advantages to the earlier embodiment for the reason that two communications groupings are also provided. A graphical user interface 158 is provided to a display 160 via a secure communication channel 162.

In the present embodiment, a banking portal user login password is required. The PASSWORD is the end user's account login password, and is known by both the app and the remote desktop session.

A challenge response approach using mutual authentication is taken as follows. Mutual authentication comprises a challenge-response handshake in both directions; the server ensures that the client knows the secret, and the client also ensures that the server knows the secret, which protects against a rogue server impersonating the real server.

Mutual Authentication Approach:
(A) The user sends a unique challenge key value (SC) to the client: SC is randomly generated by the SERVER and sent to the CLIENT
(B) The client generates a unique challenge value (CC): CC is randomly generated by the CLIENT
(C) The client computes (CR) as the hash(CC+SC+Secret): CR is computed by the CLIENT as HASH(CC+SC+PASSWORD), where HASH is a one-way hash function, such as MD5 or SHA1
(D) The client sends CC and CR is sent to the SERVER
(E) SERVER calculates the expected value of CR and verifies CLIENT responded correctly
(F) SR is computed by the SERVER as HASH(SC+CC+PASSWORD)
(G) SR is sent to the CLIENT
(H) CLIENT calculates the expected value of SR and verifies SERVER responded correctly.

Thus with the mutual authentication, once authentication between the client and server has succeeded, the session shares a SC and CC value that is unique to that connection.

Encrypted Key Presses:

In terms of Encrypted Key Presses, the approach utilizes a randomly generated string (MACHINEKEY) known to the SERVER and the CLIENT.

In terms of encrypted keypresses from the second machine (client) to the server,
(1) KEYCODE is unique index of the key pressed on the keyboard
(2) UNICODE is the Unicode value mapped from KEYCODE
(3) MACHINEKEY is a randomly generated string known to SERVER and CLIENT The Encryption function makes use of the following approach where the encrypted value of a UNICODE key is generated with the function EncryptedKey:=HASH(HASH(SC+CC+UnicodeKey)+MACHINEKEY)

Again HASH is a one-way hash function, such as MD5 or SHA1.

As the machine key is known to the SERVER and the client (in this embodiment), both the SERVER and CLIENT have all the needed pieces of information to generate an encrypted version of a given UNICODE value.

The Server Key Table Generation is as follows. On the server side, a hash table is generated with all possible encrypted key values.

EncryptedKeyTable:=EMPTYTABLE
For UnicodeKey in UnicodeKeySet:

```
EncryptedKey := HASH(HASH(SC + CC + UnicodeKey) +
    MACHINEKEY)
EncryptedKeyTable[ EncryptedKey ] := UnicodeKey
```

The Client Key Press Encoding is as follows
While AppIsRunning:

```
UnicodeKey := GetLastKeyPressed( )
EncryptedKey := HASH(HASH(SC + CC +
UnicodeKey) + MACHINEKEY)
SecureChannelSend(EncryptedKey, SERVER)
```

The Client To Server Key Press Communication, comprises EncryptedKey being generated on CLIENT and sent to SERVER. The SERVER then uses EncryptedKey as lookup to EncryptedKeyTable UnicodeKey:=EncryptedKeyTable[EncryptedKey]

Following this, the UnicodeKey is echoed to Remote Desktop Environment as a key press. Thus in this manner, once the password is actioned by the virtual keyboard, the password appears to the user as being entered in the first display environment. Various communication approaches are known and could be employed.

Figure 12:
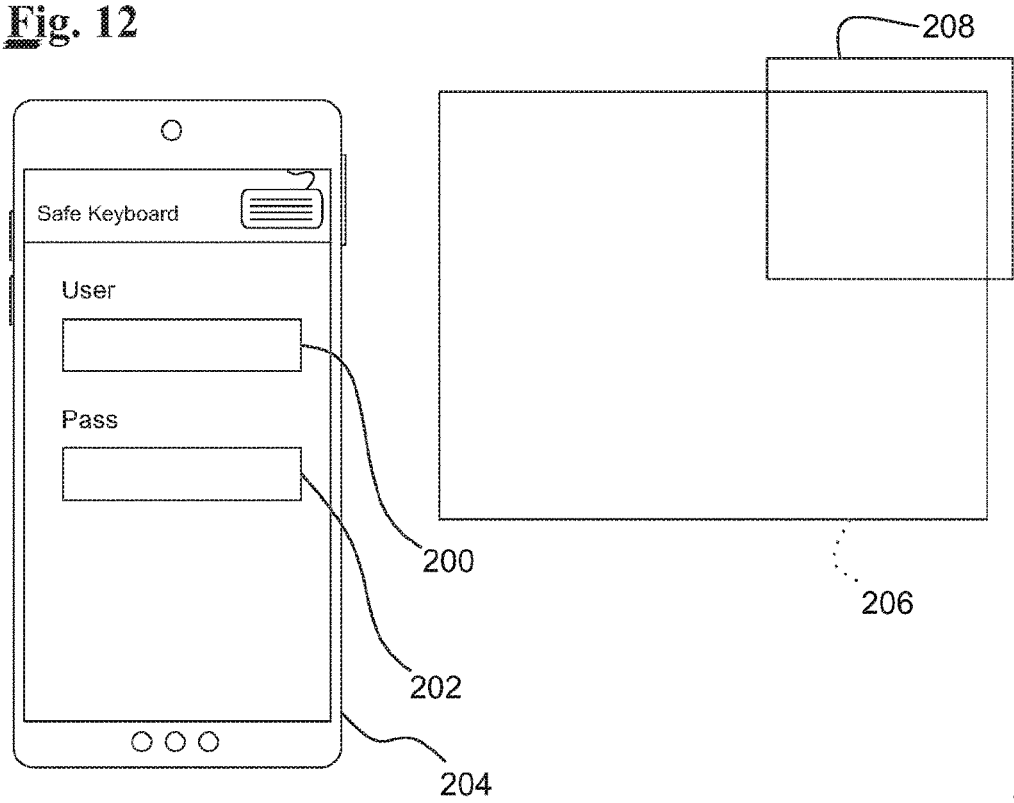
FIG. 12 provides a schematic illustration of a computer implemented system according to yet another preferred embodiment of the present invention.

FIG. 12 details an association approach as described above. As part of the approach a username 200 and a password 202 are sent from each of a number of second electronic devices 204 to provide those devices 204 with virtual keyboards (keyboard interfaces) associated with a corresponding number of first virtual machines 206.

In the system, there is a limitation of one virtual keyboard per first virtual machine 206 which means that the keyboard interfaces and the second electronic devices 204 are associated with the first virtual machines 206 on a one to one basis.

The usernames 200 and the passwords 202 are sent to a virtual machine manager 208 that manages each of the first virtual machines 206.

Figure 13:
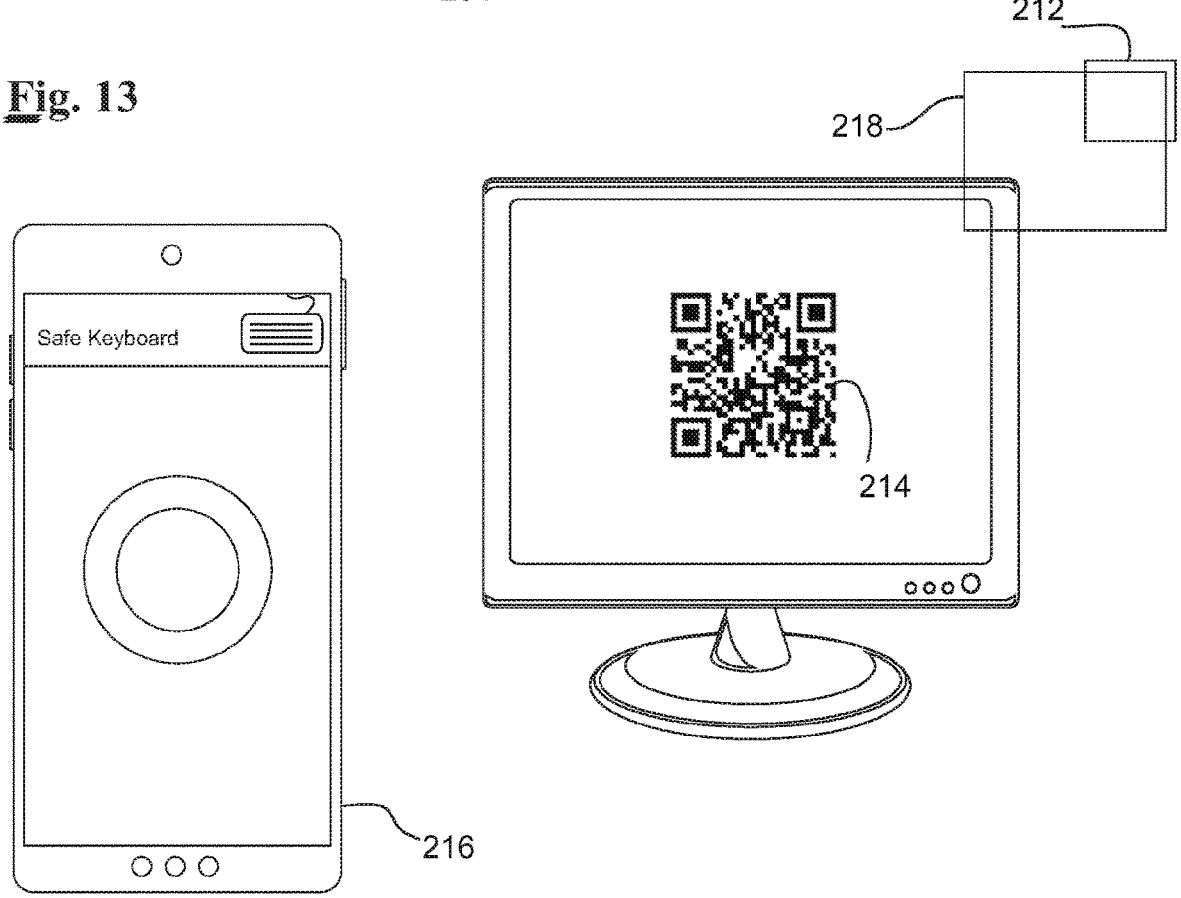
FIG. 13 provides a schematic illustration of a computer implemented system according to yet another preferred embodiment of the present invention.

Another embodiment is shown in FIG. 13. The embodiment comprises a system having an authenticator 212 that is configured to provide visual codes 214 for scanning by a number of second electronic devices 216 to provide association information. In the system the association information of a visual code 214 uniquely identifies a corresponding one of the first virtual machines 218 for the provision of a virtual keyboard.

Each visual code 214 also provides a one-time password. The one-time password is provided in the form of a nonce that is encoded into a QRCode along with the IP address information. A nonce password is used as add security measure to hide the user's actual password.

In the system, once an electronic device 216 has scanned a visual code 214, the association information is extracted. The visual codes 214 identify the first virtual machines 218 on a unique basis by each containing an IP address of a corresponding first virtual machine and the nonce.

Using this information, the electronic devices 216 connects to the authenticator 212 and provides the nonce and IP address of the corresponding first virtual machine 218. After the authenticator 212 receives and verifies the association information, a virtual keyboard connection is provided to the corresponding first virtual machine 218.

Various authenticator arrangements are possible. In one arrangement the authenticator 212 comprises an application installed on each first virtual machine 218. The application provides a MACHINEKEY as part of the response to the electronic device 214

As noted the authenticator 212 is configured to provide the visual codes having association information where the visual codes 214 identify the first virtual machines 218 on a unique basis by each visual code containing one IP address with an occasional password. The method of use of the system comprises using the second electronic devices 216 to scan visual codes 214 provided by the first virtual machines 218 and using the scanned visual codes 214 to associate the second electronic devices 216 with the first virtual machines 218. In this manner associating the second electronic devices 216 with the first virtual machines 218 comprises authenticating the second electronic devices 216 with the first virtual machines 218.

As part of the method, a user logs onto a first virtual machine 218 and is provided with a display 220 on a monitor. The display 220 provides a visual code 214. The user then scans the visual code 214 using an application on the user's mobile phone 216 and is provided with a keyboard interface to the first virtual machine 218 through the second electronic device 216.

Figure 14:
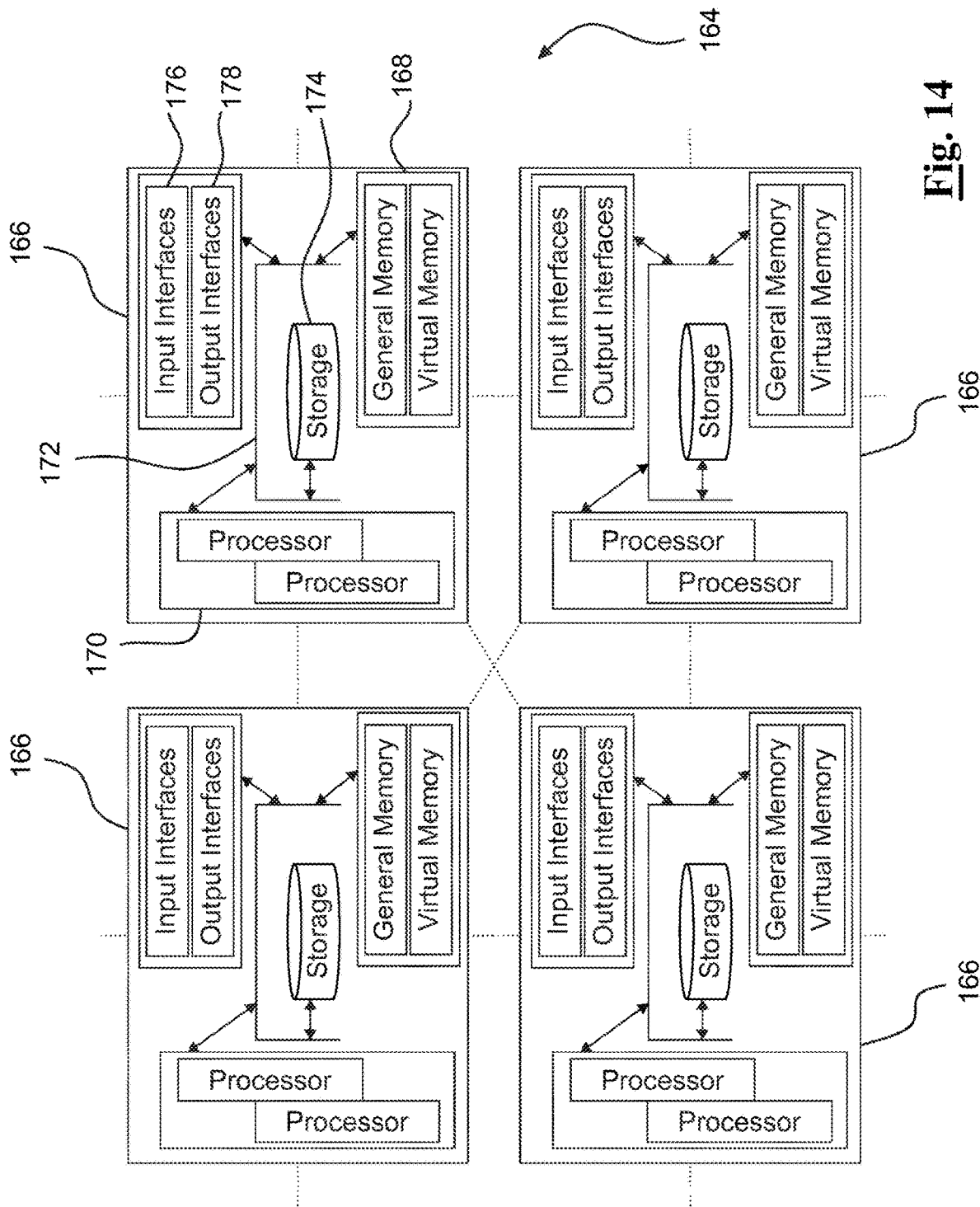
FIG. 14 provides a schematic illustration of a computer implemented system according to another preferred embodiment of the present invention.

Referring to FIG. 14 there is shown a schematic diagram of a computer system 164 that is configured to provide preferred arrangements of systems and methods described herein. The computer system 164 is provided as a distributed computer environment containing a number of individual computer systems 166 (computers/computing devices) that cooperate to provide the preferred arrangements. In other embodiments, the computer system 164 is provided as a single computing device.

As shown, a first one of the computing devices 166 includes a memory facility 168. The memory facility 168 includes both 'general memory' and other forms of memory such as virtual memory. The memory facility 168 is operatively connected to a processing facility 170 including at least one processor. The memory facility 168 includes computer information in the form of executable instructions and/or computer data. The memory facility 168 is accessible by the processing facility 170 in implementing the preferred arrangements.

As shown each of the computing devices 166 includes a system bus facility 172, a data store facility 174, an input interface facility 126 and an output interface facility 178. The data store facility 174 includes computer information in form of executable instructions and/or computer data. The data store facility 174 is operatively connected to the processing facility 170. The data store facility 174 is operatively connected to the memory facility 168. The data store facility 174 is accessible by the processing facility 170 in implementing the preferred arrangements.

Computer information may be located across a number of devices and be provided in a number of forms. For example, the data store facility 174 may include computer information in the form of executable instructions and/or computer data. The computer data information may be provided in the form of encoded data instructions, data signals, data structures, program logic for server side operation, program logic for client side operation, stored webpages and so forth that are accessible by the processing facility 170.

On one level, input interfaces allow computer data to be received by the computing devices 166. On another level, input interfaces allow computer data to be received from individuals operating one or more computer devices. Output interfaces, on one level, allow for instructions to be sent to computing devices. On another level, output interfaces allow computer data to be sent to individuals. The input and output interface facilities 176, 178 provide input and output interfaces that are operatively associated with the processing facility 170. The input and output facilities 176, 178 allow for communication between the computing devices 166 and individuals. The computing devices 166 provide a distributed system in which several devices are in communication over network and other interfaces to collectively provide the preferred arrangements. Preferably there is provided at least one client device in the system of computing devices 166 where the system is interconnected by a data network.

The client device may be provided with a client side software product for use in the system which, when used, provides systems and methods where the client device and other computer devices 166 communicate over a public data network. Preferably the software product contains computer information in the form of executable instructions and/or computer data for providing the preferred arrangements.

Input interfaces associated with keyboards, mice, trackballs, touchpad's, scanners, video cards, audio cards, network cards and the like are known. Output interfaces associated with monitors, printers, speakers, facsimiles, projectors and the like are known. Network interfaces in the form of wired or wireless interfaces for various forms of LANs, WANs and so forth are known. Storage facilities in the form of floppy disks, hard disks, disk cartridges, CD-ROMS, smart card, RAID systems are known. Volatile and non-volatile memory types including RAM, ROM, EEPROM and other data storage types are known. Various transmission facilities such as circuit board material, coaxial cable, fibre optics, wireless facilities and so forth are known.

It is to be appreciated that systems, components, facilities, interfaces and so forth can be provided in several forms. Systems, components, facilities, interfaces and so forth may be provided as hardware, software or a combination thereof. The present invention may be embodied as an electronics device, computer readable memory, a personal computer and distributed computing environments.

In addition, the present invention may be embodied as: a number of computer executable operations; a number of computer executable components; a set of process operations; a set of systems, facilities or components; a computer readable medium having stored thereon computer executable instructions for performing computer implemented methods and/or providing computer implemented systems; and so forth. In the case of computer executable instructions, they preferably encode the systems, components and facilities described herein. For example, a computer-readable medium may be encoded with one or more facilities configured to run an application configured to carry out a number of operations forming at least part of the present arrangements. Computer readable mediums preferably participate in the provision of computer executable instructions to one or more processors of one or more computing devices.

Computer executable instructions are preferably executed by one or more computing devices to cause the one or more computing devices to operate as desired. Preferred data structures are preferably stored on a computer readable medium. The computer executable instructions may form part of an operating system of a computer device for performing at least part of the preferred arrangements. One or more computing devices may preferably implement the preferred arrangements.

The term computer is to be understood as including all forms of computing device including servers, personal computers, smart phones, digital assistants, electronics devices and distributed computing systems.

Computer readable mediums and so forth of the type envisaged are preferably intransient. Such computer readable mediums may be operatively associated with computer based transmission facilities for the transfer of computer data. Computer readable mediums may provide data signals. Computer readable mediums preferably include magnetic disks, optical disks and other electric/magnetic and physical storage mediums as may have or find application in the industry.

Components, systems and tasks may comprise a process involving the provision of executable instructions to perform a process or the execution of executable instructions within say a processor. Applications or other executable instructions may perform method operations in different orders to achieve similar results. It is to be appreciated that the blocks of systems and methods described may be embodied in any suitable arrangement and in any suited order of operation. Computing facilities, modules, interfaces and the like may be provided in distinct, separate, joined, nested or other forms and arrangements. Methods will be apparent from systems described herein and systems will be apparent from methods described herein.

Several preferred embodiments of the present invention are considered to possibly provide a number of advantages including: the provision of a separate source for input of sensitive data, the separate source being isolated from the memory of the computer on which the remote desktop is displayed; the provision of a separate input source communicating directly with the server streaming the remote desktop; the provision of a separate input source isolated from the computer which does not necessarily require virtual keyboard key randomisation to prevent key loggers from determining letters associated with key clicks; the provision of a keyboard on a mobile phone that occupies the full screen of the mobile device.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including', 'or' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The claims defining the invention are as follows:

1. A computer implemented security method comprising: providing users with first virtual machines, the first virtual machines each being displayed on first electronic devices to the respective user; and providing each of the users with respective virtual keyboards, each of the virtual keyboards for receiving input from the respective user, converting the received user input into a converted user input and providing the converted user input to control the respective first virtual machine provided to the respective user, the virtual keyboards being displayed on respective second electronic devices that are different to the first electronic devices, the respective virtual keyboard being implemented distinctly from a keyboard of the respective second electronic device, such that a possible malware logger on any of the first electronic devices does not receive the input received by the respective virtual keyboard via the respective first electronic device, wherein providing each of the users with respective virtual keyboards includes providing each of the virtual keyboards as a respective second virtual machine that is distinct from each of the first virtual machines, each virtual keyboard and second virtual machine corresponding with a respective first virtual machine, and applying the input of each virtual keyboard to the respective first virtual machine.

2. A computer implemented security method as claimed in claim 1 including using each of the second electronic devices to a respective scan visual codes provided by the respective first virtual machines; and using the scanned visual codes to associate the second electronic devices with the respective first virtual machines.

3. A computer implemented security method as claimed in claim 2 including associating each of the second electronic devices with the respective first virtual machines comprises by authenticating the second electronic devices with the respective first virtual machines.

4. A computer implemented security method as claimed in claim 3 wherein authenticating the second electronic devices with the respective first virtual machines is on a one to one basis.

5. A computer implemented security method as claimed in claim 4 wherein each visual code is associated with a first virtual machine on a unique basis, the visual code containing the IP address associated with the first virtual machine and an occasional password.

6. A computer implemented security system comprising: a virtual machine manager for providing users with first virtual machines, the first virtual machines for being displayed on respective first electronic devices; a virtual keyboard manager for providing the users with a respective virtual keyboard for receiving input from the respective user, converting the received user input into a converted user input and providing the converted user input to control the respective first virtual machine provided to the respective user, the virtual keyboards for being displayed on respective second electronic devices that are different to the first electronic devices, the respective virtual keyboard being implemented distinctly from a keyboard of the respective second electronic device, such that a possible malware logger on any of the first electronic devices does not receive the input received by the respective virtual keyboard via the respective first electronic device, wherein the virtual machine manager is configured to provide the virtual keyboards as second virtual machines that are distinct from the first virtual machines, each virtual keyboard and second virtual machine corresponding with a respective first virtual machine, and the provided virtual keyboards being configured to apply the input of each virtual keyboard to the respective first virtual machine.

* * * * *